(12) United States Patent
Breving

(10) Patent No.: US 7,625,285 B2
(45) Date of Patent: *Dec. 1, 2009

(54) VIDEO GAME SYSTEM AND GAME CONTROLLER

(76) Inventor: Joel S. Breving, 4343 Conant St., Cincinnati, OH (US) 45227

( * ) Notice: Subject to any disclaimer, the term of this patent is extended or adjusted under 35 U.S.C. 154(b) by 1252 days.

This patent is subject to a terminal disclaimer.

(21) Appl. No.: 10/878,704

(22) Filed: Jun. 28, 2004

(65) Prior Publication Data

US 2004/0229692 A1 Nov. 18, 2004

Related U.S. Application Data

(62) Division of application No. 10/119,797, filed on Apr. 10, 2002, now abandoned.

(51) Int. Cl.
*A63F 9/24* (2006.01)
*A61B 5/00* (2006.01)

(52) U.S. Cl. ..................................................... 463/37
(58) Field of Classification Search ............... None
See application file for complete search history.

(56) References Cited

U.S. PATENT DOCUMENTS

| | | | |
|---|---|---|---|
| 4,149,716 A * | 4/1979 | Scudder | 463/36 |
| 4,683,891 A | 8/1987 | Cornellier et al. | |
| 5,163,690 A * | 11/1992 | Davis et al. | 463/15 |
| 5,362,049 A | 11/1994 | Hofer | |
| 5,377,100 A | 12/1994 | Pope et al. | |
| 5,447,166 A | 9/1995 | Gevins | |
| 5,568,928 A * | 10/1996 | Munson et al. | 463/37 |
| 5,571,057 A | 11/1996 | Ayers | |
| 5,676,138 A | 10/1997 | Zawilinski | |
| 5,720,619 A | 2/1998 | Fisslinger | |
| 5,740,812 A * | 4/1998 | Cowan | 600/545 |
| 6,097,981 A * | 8/2000 | Freer | 600/545 |
| 6,190,314 B1 | 2/2001 | Ark et al. | |
| 6,450,820 B1 * | 9/2002 | Palsson et al. | 434/236 |
| 6,928,329 B1 * | 8/2005 | Giaimo et al. | 700/94 |

OTHER PUBLICATIONS

Carolyn Marshall, *Getting to Konow You*, Business 2.0., Mar. 20, 2001, at 52-55.
National Aeronautics and Space Administration, *Video Games May Lead to Better Health Through New NASA Technology*, (Aug. 10, 2000) (NASA news release), available at http://oea.larc.nasa.gov/news_rels/2000/00-063.html, 2pp.

* cited by examiner

*Primary Examiner*—M. Sager
(74) *Attorney, Agent, or Firm*—Dinsmore & Shohl LLP

(57) ABSTRACT

Game controllers having a communication link to a game systems, a processor, and a photoelectric plethysmography, a galvanometer, or a thermocouple. Video game systems having a video game processor, a computer readable medium containing executable instructions for providing a video game and the game controller.

11 Claims, 14 Drawing Sheets

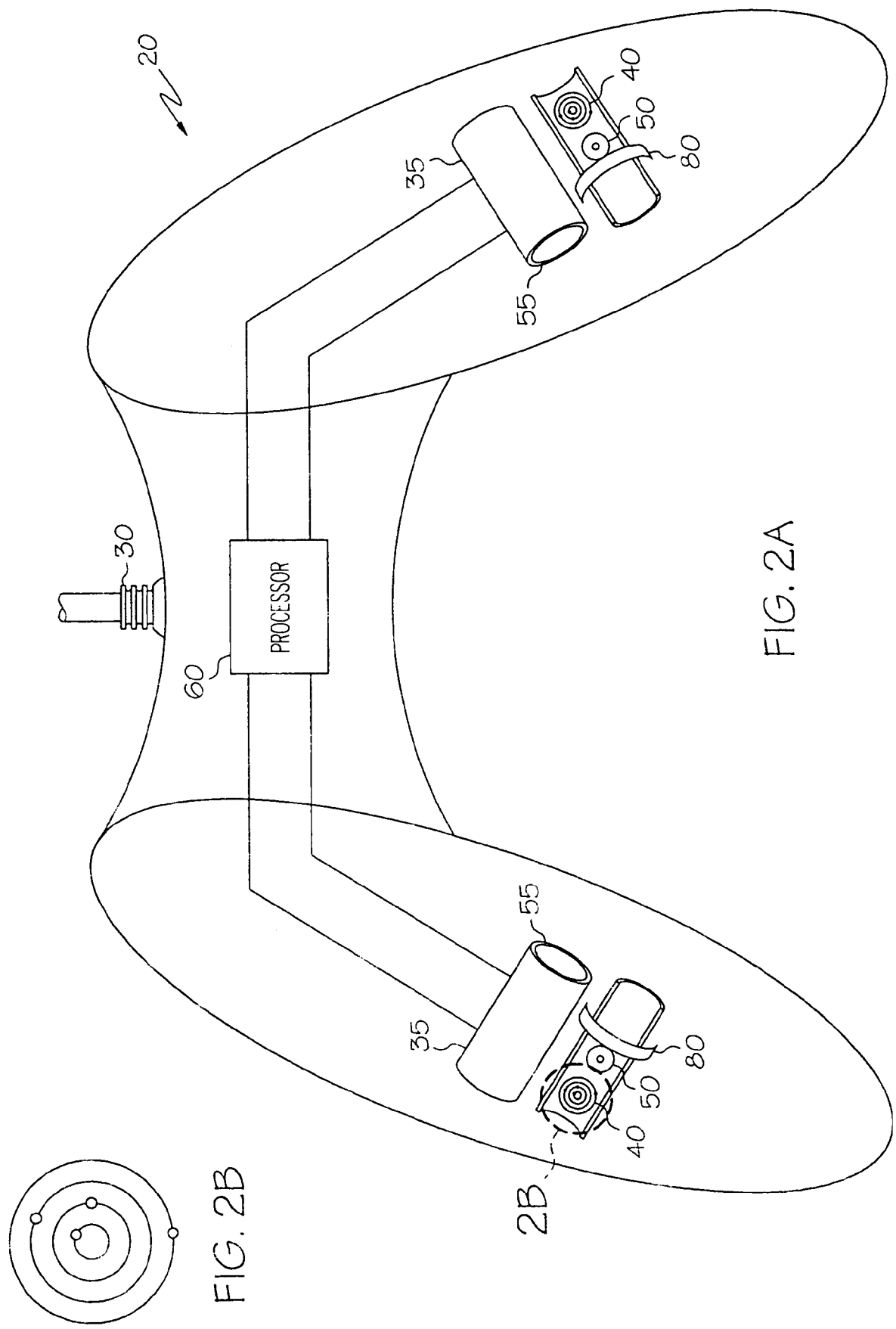

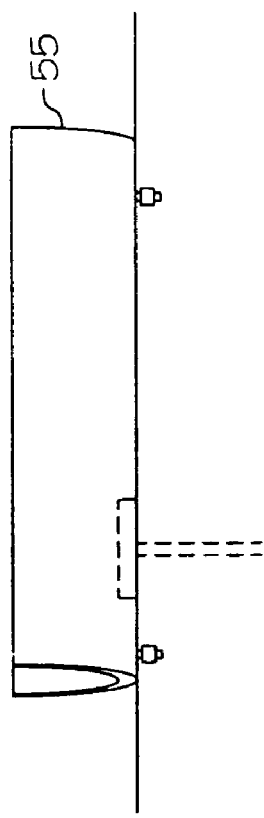
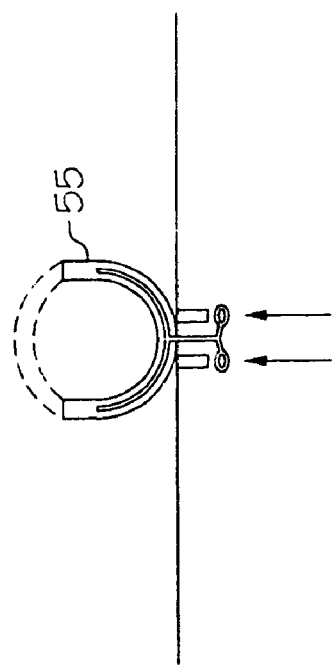

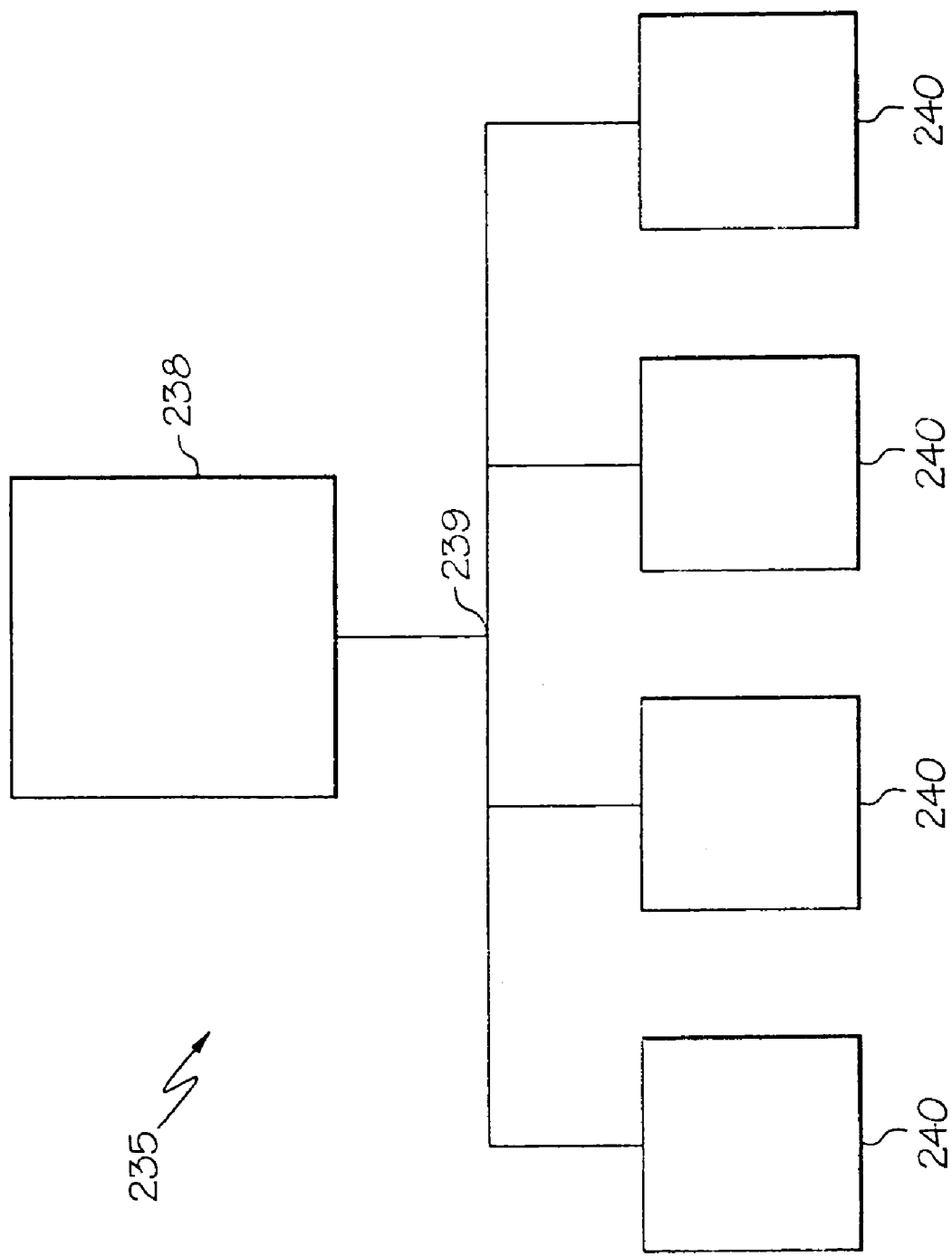

VIDEO GAME SYSTEM AND GAME CONTROLLER

RELATED APPLICATIONS

The present application is a Divisional of U.S. application Ser. No. 10/119,797 filed Apr. 10, 2002 now abandoned. The entire disclosure of which is hereby incorporated by reference.

TECHNICAL FIELD

The present invention relates generally to video gaming systems and game controllers, and more specifically to a unique video game controller and video game system for the interactive collection of bio-feedback data relating to human interaction with the video game system.

BACKGROUND OF THE INVENTION

The virtual explosion of technical advances in microelectronics, digital computers and software have changed and continue to change the face of modern society. In fact, these technological advances have become so important and pervasive that this explosion is sometimes referred to as "the information revolution." Through telephone lines, networks, satellite and other wireless communications and the like, information and resources are ever increasingly being accessed and shared.

The present invention is related to the field of video games that allow for a broader range of interaction between the player and the game. Current video game systems have failed to, on an economical basis, provide information regarding the physiological state of the human participant and respond to this information in the actual progression of the game. Various bio-feedback measuring devices have been invented during the past century.

The idea of acquiring knowledge of a person's vascular physiology by utilizing diffraction and refraction of infrared light has been around for a long time. In 1938, Hertzman used a photoelectric plethysmograph to study the blood supply to various tissues of the body. The practical application of this technology was significantly advanced in the mid-1980s when Wesseling and Settles, et al. invented the FINAPRES which utilized photo-plethysmography and a finger pressure cuff to measure the arterial pressure of the digits. The Finapres allows for non-invasive blood pressure measurement, but has limited usefulness in medical applications because the method consistently underestimates mean arterial blood pressure. However, in a video gaming system, the required accuracy of the measurements is greatly reduced. Today, photoplethysmography can be utilized to measure blood volume pulse revealing a rough estimate of the degree of vasodilation/vasoconstriction of a tissue. By varying the wavelength of the light source used, different parts of the vascular tree can be examined (small arteries 950 nm vs. arterioles 560 nm).

Another bio-feedback device was discovered around 1900 when Deprez-D' Arsonvals discovered the galvanometer. He discovered that when a person perspires, the skin is able to conduct electricity more easily. Deprez-D' Arsonvals measured the change in resistance that resulted from the current passed between two electrodes. In 1907, Carl Jung used a galvanometer to measure skin resistance under stressful situations. Galvanometers have been included in polygraphs invented by Keeler as early as 1925 as one means of measuring autonomic arousal. Near the end of the 20th century, Gettes, et al. proposed four silver electrodes for the simultaneous measurement of skin resistance and heart rate. Various galvanometers are known to one skilled in the art.

Another bio-feedback device is a thermocouple. A thermocouple comprises two pieces of dissimilar metal in close contact, between which there is an electrical potential field that varies as a function of temperature. An example of an early developed thermocouple consisted of two iron and constantan wires wrapped around each other. Later thermocouples were improved using copper and constantan wire as described by Grucza et al. Thermocouples can also be utilized to measure respiratory rate. Cyna et al. discloses the ability to monitor respiratory rate and the expiratory to inspiratory ratio utilizing a thermocouple comprising polarized polyvinylidine fluoride strips.

The field of biofeedback started in the 1970s and typically consisted of patients being exposed to their physiological state, such as a pulse or peripheral skin temperature measurement and just by the mere fact of being made aware to this knowledge, the patient was believed to be able to gain control over their physiological state. This is the most basic definition of biofeedback. Today, most technology based on this original concept can be considered biofeed-forward. The patient is given instructions or suggestions on how to control his physiological state and by this indirect method, the patient can gain control over his peripheral skin temperature or pulse.

Currently, there is a small sect of systems that combine bio-feedback & video game technology. Thought Technology developed the PRO COMP+ System that can be used in conjunction with BIOGRAPH Software to allow clinicians to carefully monitor various modalities of physiological variables while performing tasks on computer. In one game by Thought Technology, the speed of a race car can be altered by the participant's ability to change perspiration monitored by a galvanometer. The J & J I-330 biofeedback system has a "catching game" that allows participants to control a basket to catch eggs by altering their muscle tension. BOS offers a children's game "Space Lander" that allows participants to land a spacecraft by altering their EMG signals. In another game designed by SRS Orion Systems, the "Tortoise and Hare" the participant can send the hare onto victory by controlling their skin temperature or muscle tension.

The prior bio-feedback systems typically have one or more of the following disadvantages:

(A) the monitoring technology is bulky, cumbersome and bothersome to participants;

(B) these systems only monitor a specific array of physiological variables;

(C) the software used with these systems are not compatible with current video game systems;

(D) the hardware used with these systems are not compatible with current video games systems:

(E) the software used with these systems is limited;

(F) limited therapeutic use can be raised because it addresses one or two physiological variables;

(G) because of the simplicity of the system, games are geared typically towards a restricted age group of children; and (H) physiological signals are not appropriately formatted so that they are directly relayed to the software of current day video game systems.

With a growing advance in the "technical revolution," there is a need to improve the quality and efficiencies of interactive systems and controls for transferring biofeedback information from human participants to video gaming systems. The present invention provides a unique way to facilitate such transfer and interaction between the participant and the video gaming system.

Biofeedback is currently used as treatment for a multitude of medicinal illnesses including headaches, anxiety, sleep disorders, attention-deficit hyperactivity disorders, seizures, asthma as well as learning disorders. Unfortunately treatment has been constrained by the limited capability of current biofeedback technology. The present invention synergistically enhances treatment possibilities by developing a system that improves the quality and efficiency of biofeedback incorporating that technology into current day video game technology. The present invention allows a unique way to facilitate the interaction between participant and video game system opening up endless possibilities.

SUMMARY OF THE INVENTION

Accordingly, it is an object of the present invention to provide novel systems for the interactive collection of biofeedback information relating to participants interacting with video gaming systems which overcome one or more disadvantages of the prior art. It is another object of the present invention to provide novel apparatus for transferring information relating to biofeedback of participants of video games to video game systems. These and additional to objects and advantages are provided by the video game systems and controllers of the present invention.

One aspect of the present invention is a game controller for the interactive collection of biofeedback from human participation in a video game system. In an exemplary embodiment, the game controller, comprises a communication link between a game system, a processor, and one or more components selected from the group consisting of: a photoelectric plethysmography, a galvanometer and a thermocouple. The processor processes executable instructions for providing the bio-feedback measurements of one or more of the components to the video game system.

Another aspect of the present invention is the interactive video gaming system for collecting biofeedback information related to a participant's interaction with the video game system. In an exemplary embodiment, the system comprises a video game processor, a computer readable medium containing executable instructions for providing a video game and a game controller of the present invention.

Yet another aspect of the present invention is the interactive handheld video gaming system for collecting biofeedback information related to a participant's interaction with the handheld video game system. In an exemplary embodiment, the handheld system comprises a shell, a video game processor, a computer readable medium containing executable instructions for providing a video game, a display incorporated into the shell of the handheld system, and one or more biofeedback reading devices incorporated into the shell of the handheld system.

Still other objects, advantages and novel features of the present invention will become apparent to those skilled in the art from the following detailed description which is simply, by way of illustration, various modes contemplated for carrying out the invention. As will be realized, the invention is capable of other different obvious aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctively claiming the present invention, it is believed that the same will be better understood from the following description taken in conjunction with the accompanying drawings, in which:

FIG. 2 is a schematic illustration of a bottom view of a game controller of FIG. 1;

FIG. 3 contains various crossectional views of the finger pressure cuff of the game controller of the present invention;

FIG. 8 is a schematic illustration of an exemplary client server network;

DETAILED DESCRIPTION OF THE EXEMPLARY EMBODIMENTS

Reference will now be made in detail to various embodiments of the invention, various examples of which are illustrated in the accompanying drawings, wherein like numerals indicate corresponding elements throughout the views.

Figure 1:
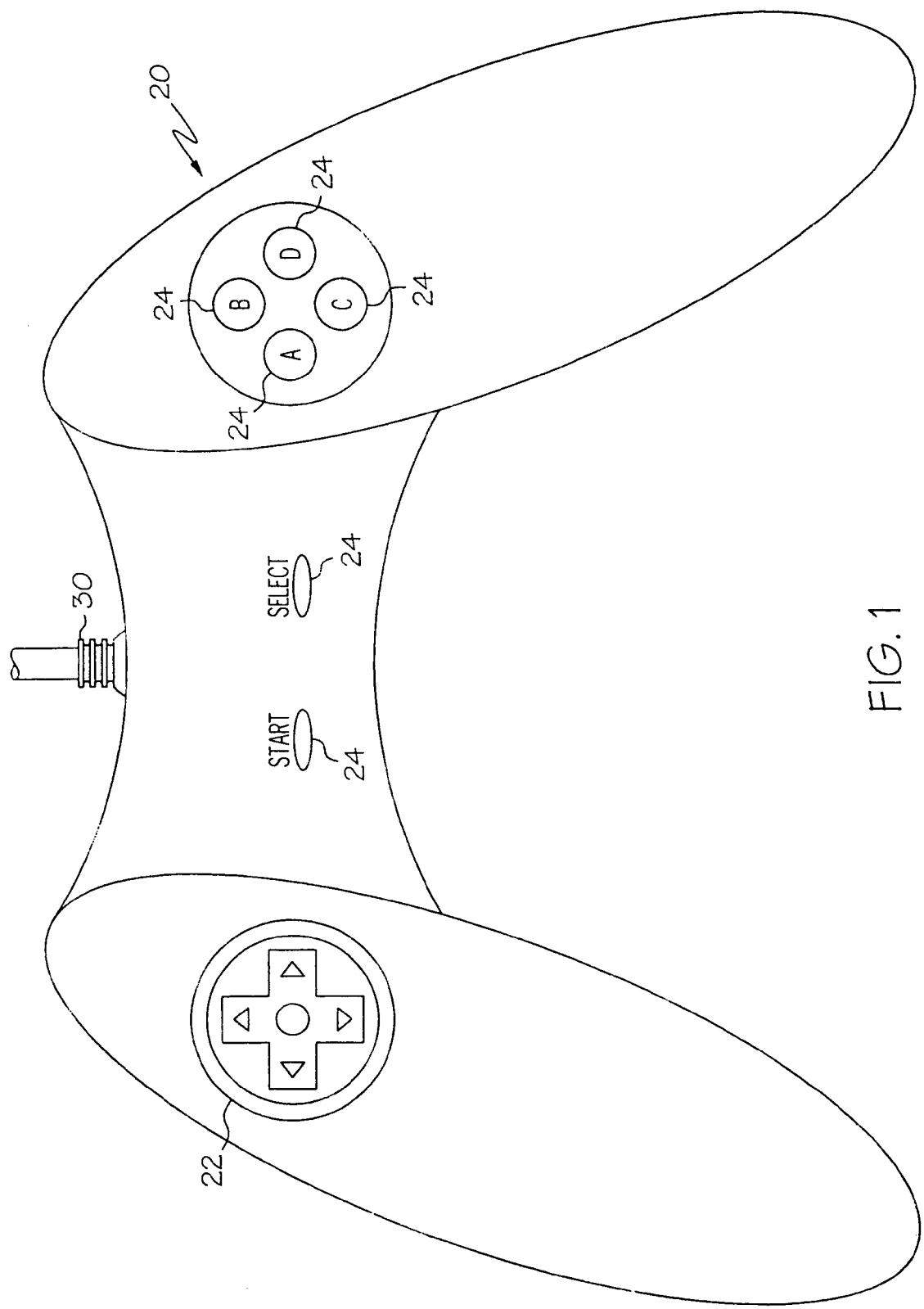
FIG. 1 is a schematic illustration of a top view of the game controller of the present invention.

One embodiment of the present invention is schematically illustrated in FIG. 1 which depicts a game controller 20 for collection and distributing biofeedback information of a human participant of the video gaming system in accordance with one aspect of the present invention. In an exemplary embodiment, the video game controller 20 comprises a conventional motion controller 22, one or more conventional selection buttons 24, and a communication link 30 to the video game system. In addition, the video game controller 20 (as depicted in FIG. 2), further comprises one or more components selected from the group consisting of a photoelectric plethysmography 35, a galvanometer 40 and a thermocouple 50. In one embodiment, the video game controller 20, further comprises a processor 60. The processor 60, for example, may comprise a set of executable instructions such as in the form of software, routines, programs, algorithms, code and the like, which would inter alia, measure a users biofeedback at any given time.

The video game controller 20 is preferably provided in communication, such as via the token ring, ethernet, telephone modem connection, radio or microwave connection, parallel cables, serial cables, telephone lines, universal serial bus "USB", Firewire, Bluetooth, fiber optics, infrared "IR", radio frequency "RF", and the like, or combinations thereof, with a video gaming system through the communication link 30.

Figure 4:
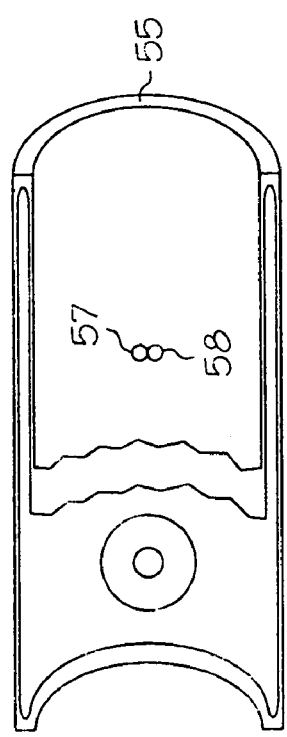
FIG. 4 is a schematic illustration of a bottom-crossection view of the finger pressure cuff of the controller of the present invention.

In another exemplary embodiment depicted in FIG. 2, the video game controller 20 further comprises at least one finger pressure cuff 55. The finger pressure cuff 55 is configured to allow insertion of a digit (human finger) into at least a portion of the finger pressure cuff 55. An exemplary view of the finger pressure cuff is depicted in FIG. 3. Once a digit is inserted into the finger pressure cuff 55, compressed air inflates an inflatable bladder to create a pressure change on the inserted digit in the finger pressure cuff 55. As depicted in FIG. 4, the inflated bladder 55 presses the tissue of the digit against the photo-diode 57 and LED 58 allowing the two to function as a photoelectric plethysmography by capturing reflected infrared light from the LED at the photo-diode.

In an alternative embodiment, an LED and photodiode are present without a pressure cuff. In this embodiment, blood volume pulse may be obtained by low pass filtering of the signal (to eliminate noise) and high pass filtering (eliminate continuous component). A LED/photo-diode can also be used to measure heart rate. The signal is first high pass filtered to remove high frequency elements and then amplified by a three stage operational amplifier. Respiration can also be obtained from fluctuations of the signal from baseline due to pulse paradoxes or baseline changes in diastolic and systolic blood pressure due to respiration.

In another exemplary embodiment, the video game controller further comprises at least one digit retention ring 80 located adjacent to a galvanometer 40 and thermocouple 50 as depicted in FIG. 2. The digit retention ring 80 is configured to allow the insertion of a digit through at least a portion of the digit retention ring 80 and it places the digit in communication with the thermocouple 50 and galvanometer 40. The galvanometer 40 is configured to measure a change in resistance across two electrodes in physical communication with a digit. The galvanometer 40 electrodes measure general skin conductivity of the digit. The skin conductivity is altered by perspiration of the participant. Thus, changes in the conductivity of an electrode can be interpreted as changes in perspiration by the processor 60. These changes in perspiration can then be communicated to the video gaming system through the communication link 30. In one exemplary embodiment, utilizing four silver electrodes, along two wires, the voltage can be measured to monitor for changes in skin conductivity and also allow a one lead ECG (FIG. 2B). One skilled in the art will appreciate that any conventional galvanometer is suitable for the present invention.

In another exemplary embodiment, the game controller comprises multiple pulse-pressure detectors (photoelectric plethysmography). The participant, after grasping the controller, may be instructed to insert one of their digits, usually their middle finger, into at least one of the pulse-pressure-detectors finger pressure cuffs. In one exemplary embodiment at the proximal end of the finger pressure cuff are two wires which run lengthwise along the cuff into the controller. The cuff is attached to the controller by flexible plastic that is reinforced and continuous with the bladder inside the cuff. One skilled in the art will appreciate that a multitude of flexible materials may be utilized to form the inflatable bladder and the finger pressure cuff. At the end of one of the wires running lengthwise along the cuff is an LED probe that emits infrared light into the tissue of the digit. Part of the light is reflected back to a photo diode connected to the other wire running lengthwise along the cuff, and the reflected light may be substantially filtered and converted to an electrical signal which is transmitted back to the processor 60 and ultimately to the video gaming system through the communication link 30. The finger pressure cuff can be adjusted to maintain a continuous blood volume in the tissue of the digit through a servo-control mechanism. The pressure needed to maintain a transmural pressure of approximately "0" is known as the pulse pressure. Such a device is manufactured by Finapress as well as Ohmeda Monitoring Systems and known to one skilled in the art. This information may be useful to programmers who add custom features to the software application.

In yet another exemplary embodiment, the game controller comprises a thermocouple 50. The thermocouple 50 is configured to measure changes in temperature of the tissue of the digits. Conventional thermocouples known to one skilled in the art may be utilized for measuring the temperature of the digits. Exemplary thermocouples include K type thermocouple "alumuel-chromel" by Omega Engineering and J, K, T. E thermocouples from Io Tech. Thermistors typically give a more imprecise measurement of temperature but can also be utilized on the game controllers. Yellow Springs manufactures a thermistor that would be suitable.

Figure 5:
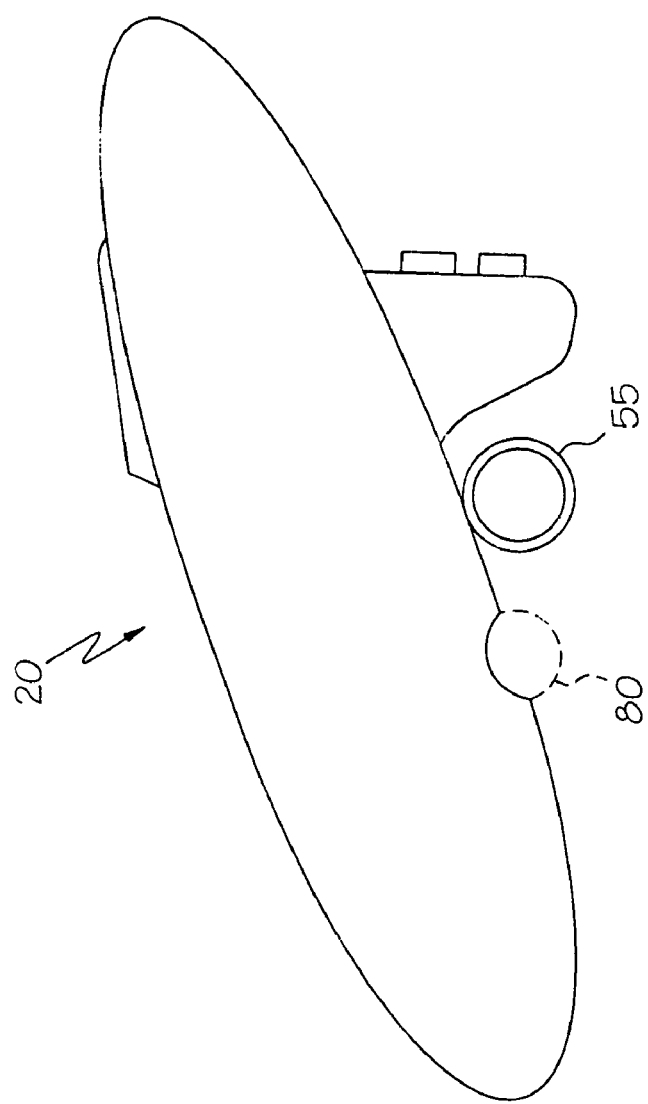
FIG. 5 is a schematic illustration of a side view of the game controller of FIG. 1.

FIG. 5 is an exemplary side view of the video game controller in which the finger pressure cuff 55 and digit retention ring 80 are shown adjacent each other in an exemplary layout.

The game controller body and other conventional aspects may be constructed from materials known to one skilled in the art. For example, the game controller body may be constructed from polycarbonate, polystyrene, polyvinyl chloride, and the like.

Figure 6B:
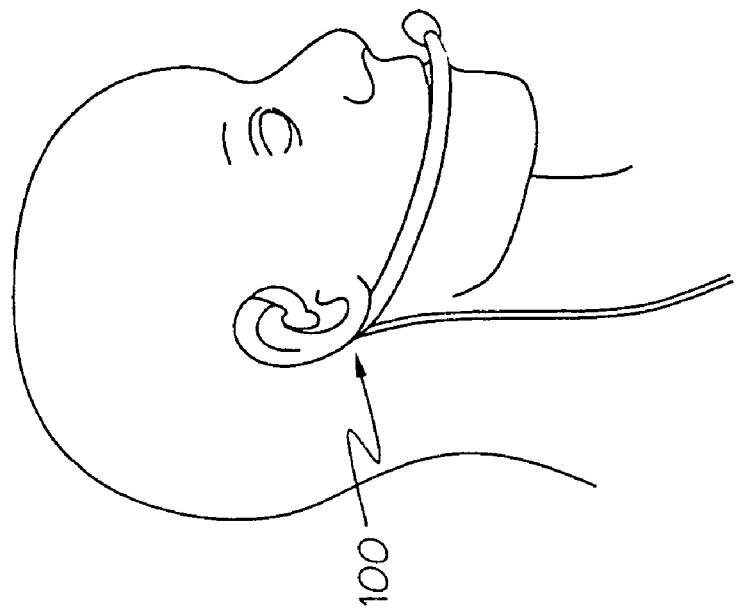
FIG. 6 is a schematic illustration of a bio-feedback ear piece of the present invention.
Figure 6A:
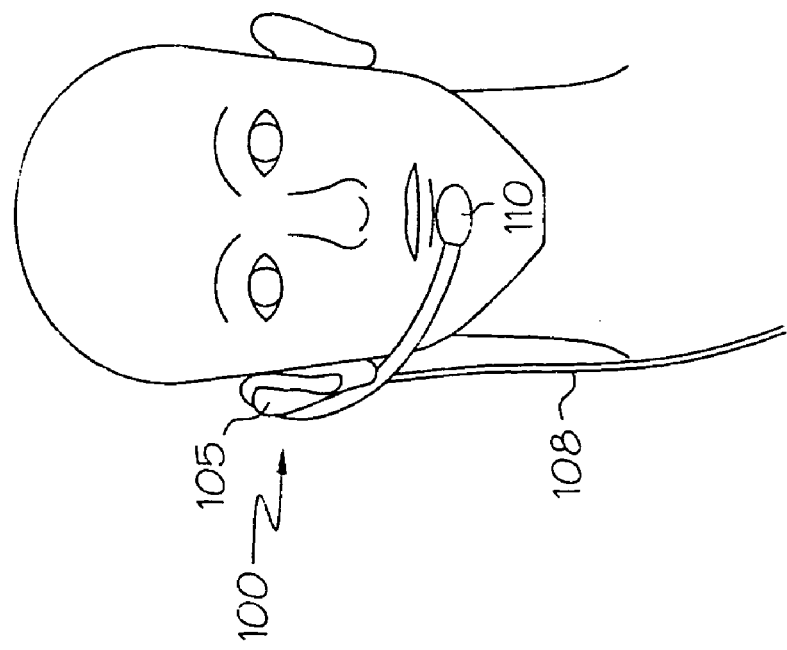
Figure 7B:
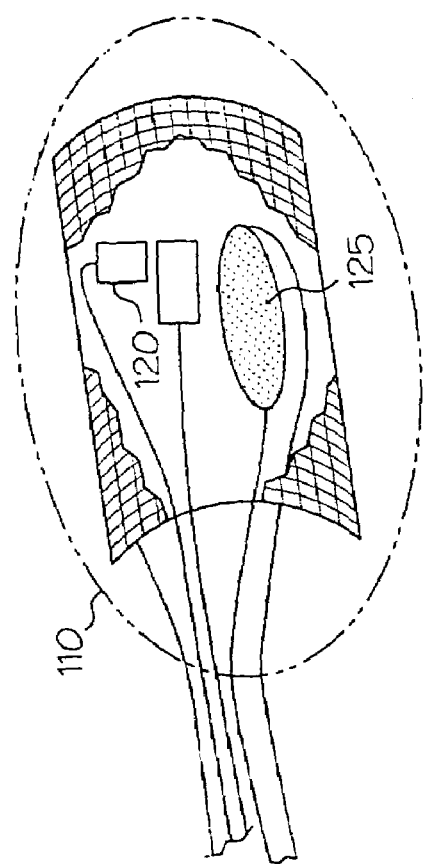
FIG. 7 is a schematic illustration of a close-up view of the voice-respiratory sensor and speaker of the ear piece of FIG. 6.
Figure 7A:
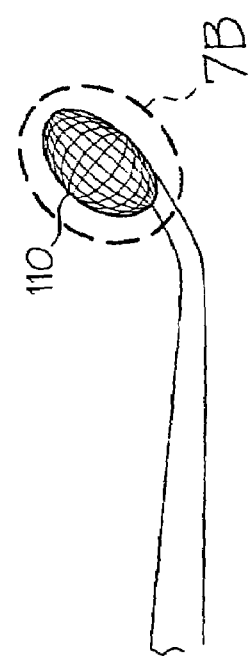

Another embodiment of the present invention depicted in FIG. 6, is a biofeedback ear piece 100 for a video game system. The biofeedback ear piece 100 comprises a speaker 105, a communication link 108 and a respiratory voice-sensor 110. The speaker 105 and the respiratory voice sensor 110 are in electrical communication with the communication link 108. As shown in this exemplary embodiment, the respiratory voice sensor 110 comprises a polyvinylidine fluoride thermocouple 120. It measures voltage changes between the two layers of the thermocouple which arises from the temperature differences between inhaled and exhaled air. This signal can then be processed with the processor 60 into waveform to give a snapshot of the participants inspiration/expiration rate. The ear piece further comprises a microphone sensor 125 located adjacent the thermocouple 120. Thermocouple 120 and microphone sensor 125 are located at the distal end of the ear piece 100. In an exemplary embodiment, the ear piece 100 is made of material such as a bendable metal or polymer so the microphone sensor 125 and thermocouple may be placed directly in front of the mouth of a human in order to better detect respirations and communication from the participant. In an alternative embodiment, capnography or a non-invasive infrared $CO_2$ measuring and recording apparatus could be used to reveal information about respiratory rate. The proximal end of the ear piece 100 comprises a speaker 105, through which the video game system may play audio or instructions for the participant.

Another aspect of the present invention is a video gaming system comprising of a video game processor, a computer readable medium containing executable instructions for providing a video game and the game controller of the present invention.

Often computers telecommunication with each other and share information, application and/or services. Sometimes in this setting, the various computers are referred to as nodes, which is a generic term referring to access points in an interconnected system. One type of computer network employs a client-server architecture. The portions of network applications that interact with human users are typically separated from the portions of network applications that process requests and information. Often, the portions of an application that interact with users or access network resources are called client application or client software and, portions of an application that processes requests are called server applications or server software. Client machines tend to run client software and server machines tend to run server software, however, a server can be a client as well.

In an exemplary embodiment, the video game system will typically be provided on a client machine, while the software containing the computer instruction which comprises the instructions to collect and measure the biofeedback from the human could be located on the client computer or the server computer, separate of the client machine. FIG. 8 schematically illustrates a sample client-server network 235 which might be employed to implement an embodiment of the present invention. As one with ordinary skill in the art will readily appreciate, a client-server network is only one type of network and a variety of other configurations, such as peer-peer connections are also considered networks. In a client-server network, a plurality of nodes are interconnected to various nodes send and receive information to/from one another. As shown here, a server node (238) is interconnected with a plurality of client nodes (240) using a connection (239) such as a token ring, ethernet, telephone modem connection, radio or microwave connection, parallel cable, serial cables, telephone lines, universal serial bus "USB", Firewire, Bluetooth, fiber optics, infrared "IR", radio frequency "RF", and the like or combinations thereof. As one skilled in the art can appreciate, the video game system may be connected to other video game systems or servers which further process and/or distribute the biofeedback information and similarly send instructions back to the video game system in order to respond to the biofeedback measurements with the participant. Likewise, one skilled in the art will appreciate, the video game controller of the present invention could act as a client computer itself and be connected through a communication link to a server node.

Figure 9A:
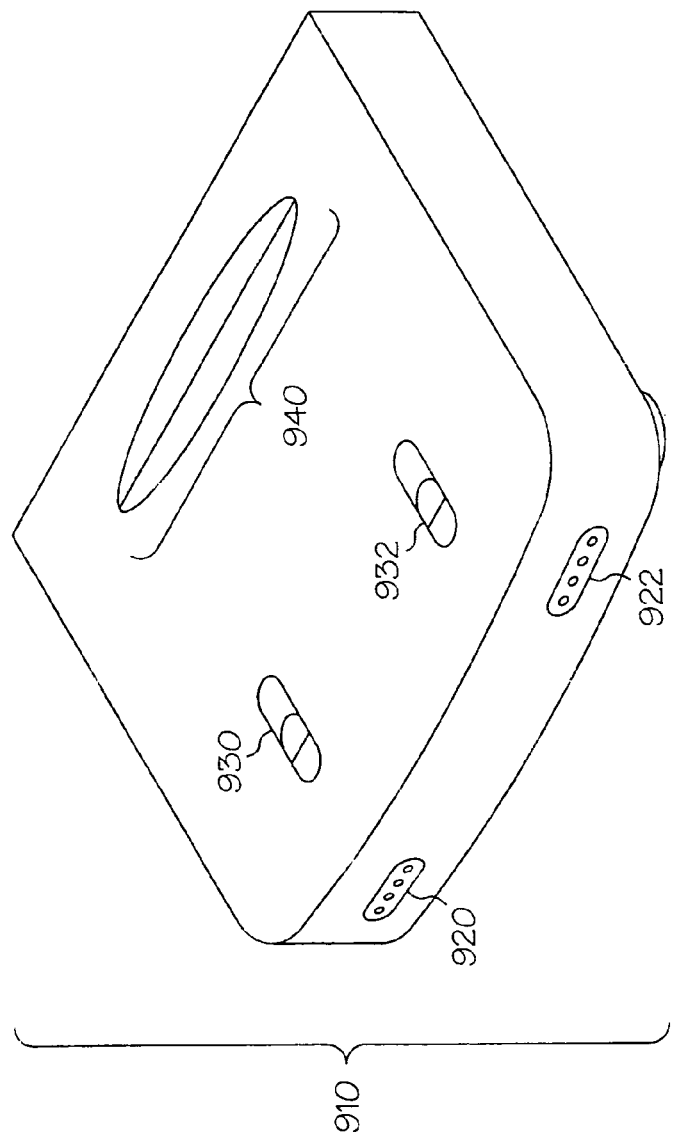
FIG. 9 is a schematic illustration of a typical video game system known in the art.
Figure 9B:
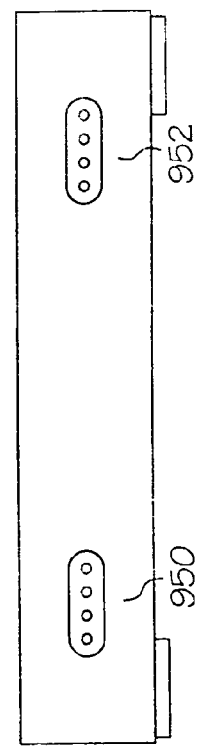

The general structure of the video game hardware (910) or the control deck can be observed in FIG. 9. As one skilled in the art will appreciate, the structure may comprise a multitude of various arrangements. On the front panel, facing the viewer are two controller adapters (920 & 922) that can interface With controllers. A game port (940) can be visualized on the top, back of the control deck that allows the interface of the hardware and the software. Also on the top of the control deck is an on/off switch (930) and a reset button (932) that interrupts the running of the software and returns to the beginning of the software program. On the back view of the control deck is an AC power supply port (950) that connects an outside power source to the circuit board. Also, located on the back of the system is a connector (952) that allows the processed data from the software to be transferred and displayed on a monitor via an audio/video cable.

Figure 10:
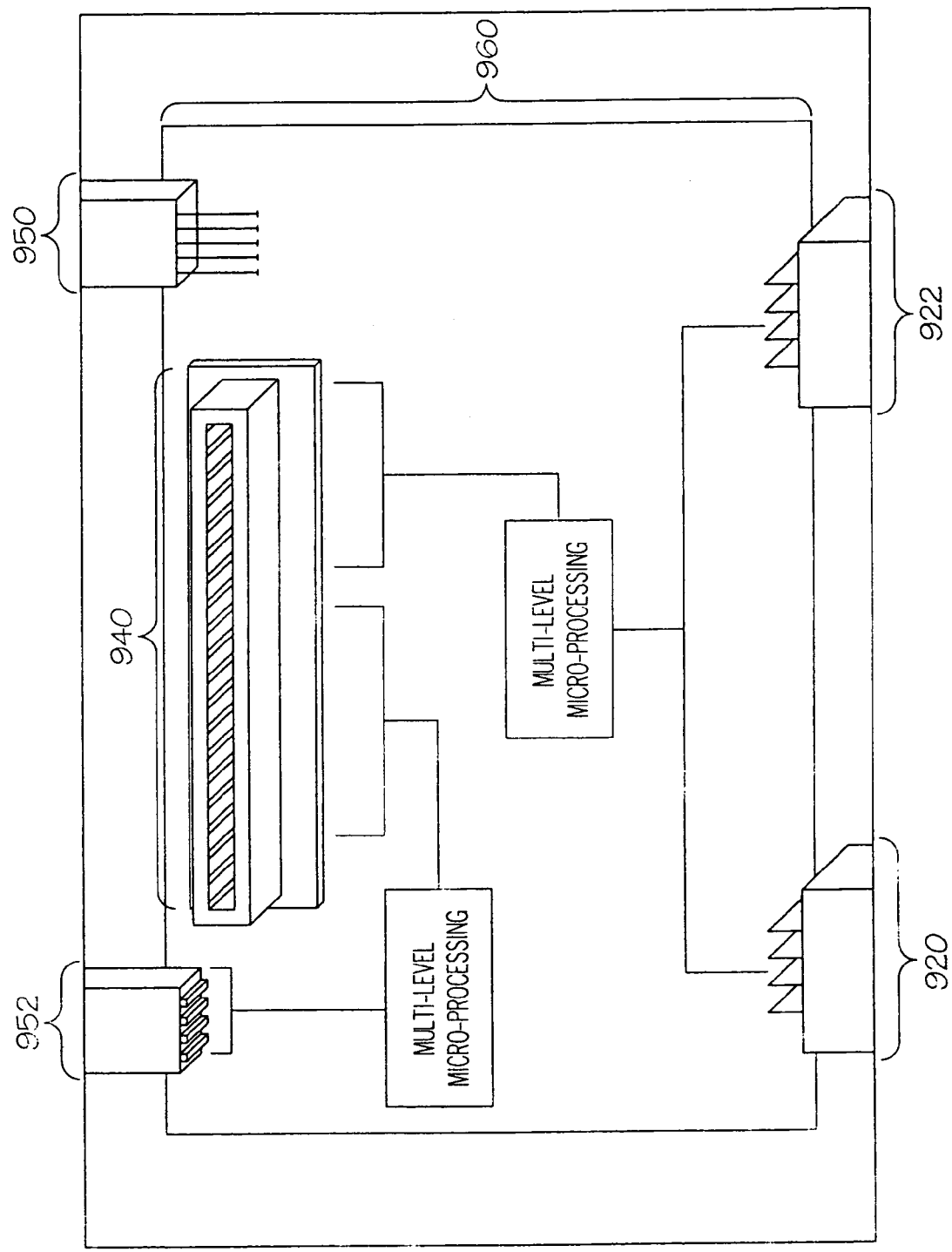
FIG. 10 is a schematic illustration of an interior view of the video gaming system of the present invention.

The inside view of the hardware system is depicted in FIG. 10. The main component inside the hardware is a circuit board (960). Attached to the circuit board on the front face are adapters 1 and 2 (920 & 922) that interface with the controllers. Two distinct data types are sent to the circuit board via the controllers. The first is data resulting from the manual manipulation of the controller, while the second is the unprocessed physiological data that is also relayed back to the circuit board. Both undergo multi-level micro-processing, separately, on the circuit board and eventually that processed data is relayed to the software. One skilled in the art will appreciate that the physiological data and data resulting from manual manipulation may be processed together. The port (940) for interface between the software and the circuit board can be visualized on the back of the circuit board. The data is stored and accessed by the software, incorporated into the program in real time and the output is sent back to the circuit board where it is further processed and then delivered to a video monitor via the connector port (952). The a/c current is delivered to the circuit board via the A/C power supply port (950) located on the back, right of the circuit board.

Figure 11:
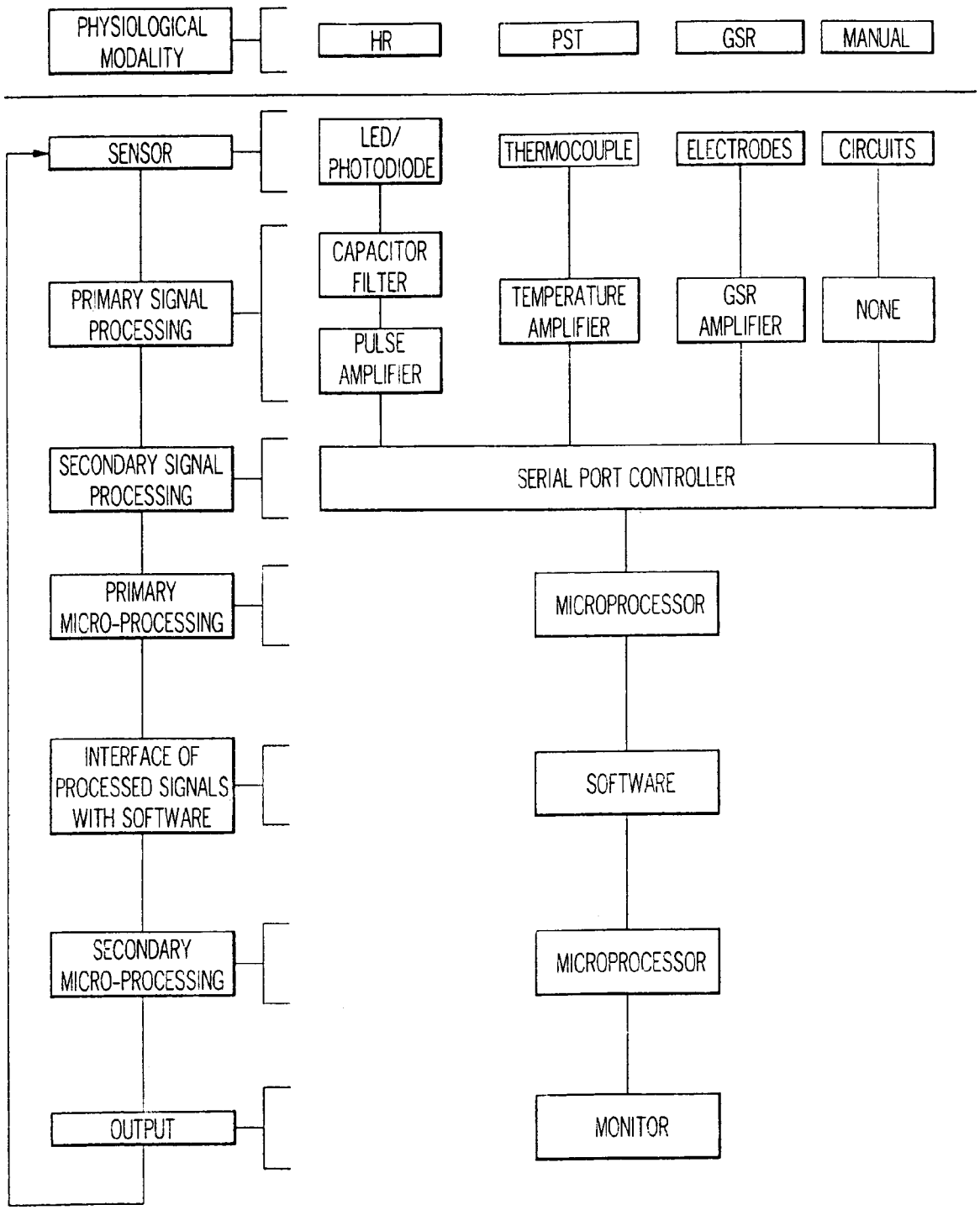
FIG. 11 is a schematic illustration of exemplary components of the present invention.

FIG. 11 depicts an exemplary embodiment of the present invention. FIG. 11 details an exemplary progression of signals as they are processed by the present invention. The game controller has the ability to monitor various phenomenon including GSR (electrodes), temperature (thermocouple), heart rate (LED/photoreceptor) of the participant as well as mechanical manipulation of the controller through internal circuitry and electrical impulses. These raw data streams undergo a primary processing. In the case of heart rate, the signal received back from the photodiode is first high pass filtered to remove high frequency elements from the signal and then amplified in one embodiment using a three stage operational amplifier. In the case of GSR and temperature, the initial signal across the electrodes is amplified using a GSR and temperature signal amplifier, respectively. These transformations are commonplace and known to one skilled in the art. In this schematic diagram, only three physiological variable are addressed. As alluded to before, a multitude of physiological variables can be obtained through the controller including respiration rate (LED/photoreceptor or polyvinylidine fluoride thermocouple), blood volume pulse (LED/photoreceptor), digital arterial pressure (LED/photoreceptor with cuff and servo control mechanism) and P-R interval (four silver electrode system) among others. These signals undergo unique and separate primary signal processing but subsequent transformations are identical to the processing modalities discussed above. Data streams from the manual controls do not undergo primary processing. Primary signal processing may occur in the controller, in the hardware of the system, or even elsewhere depending on the particular embodiment of the invention. All modalities of signals undergo secondary signal processing at a serial port controller. The function of which is to sync the data streams together and to transform the streams into a form that can be easily recognized by a computer. The signals after primary processing are converted from analog to digital form. The resulting signals are then delivered to shift registers which pass the separate signals to a serial to parallel converter. Once in digital, parallel form the data streams have completed secondary signal processing and travel along a data bus for primary micro-processing. In one exemplary embodiment, the microprocessor relays the data to a ROM unit that stores the processed data. Then, a RAM unit accesses the data stored in the ROM unit and calculates a mean, standard deviation, running mean, running standard deviation, and lastly calculates the z value. The z value represents the number of standard deviations the physiological data $x_i$, is away from the running mean on a second to second basis. The z values from all the separate physiological variables is delivered to shift registers, and the streams of data are converted from serial to parallel form. The parallel data is then relayed to a data bus that delivers the data to the software to be stored and read. The results is a multi-level micro-processing system that collects the stream of physiological data and sends it in a form that can be easily utilized by the software.

The information from the manual controls is initially processed in a similar manner. At a serial port controller, the data is first converted from analog to digital data, then converted into serial form by shift registers and finally converted to parallel form. This procedure is well documented in the current art of video game manufacturing and well known to one skilled in the art.

Next, the data is delivered to a distinct multi-level micro-processing unit and then relayed to the software (ROM) to be stored and read. The data from the controls is processed separately from the physiological data.

In one exemplary embodiment of the present invention, two types of information are delivered to the software: the processed data from the manual manipulation of the controller and the processed physiological data. The software is able to respond to both in the actual progression of the game/program. The software, after integrating these two signals into the running of its program, sends output back to the hardware where it undergoes multi-level processing before it is sent to a video monitor to be viewed by the player.

Figure 12:
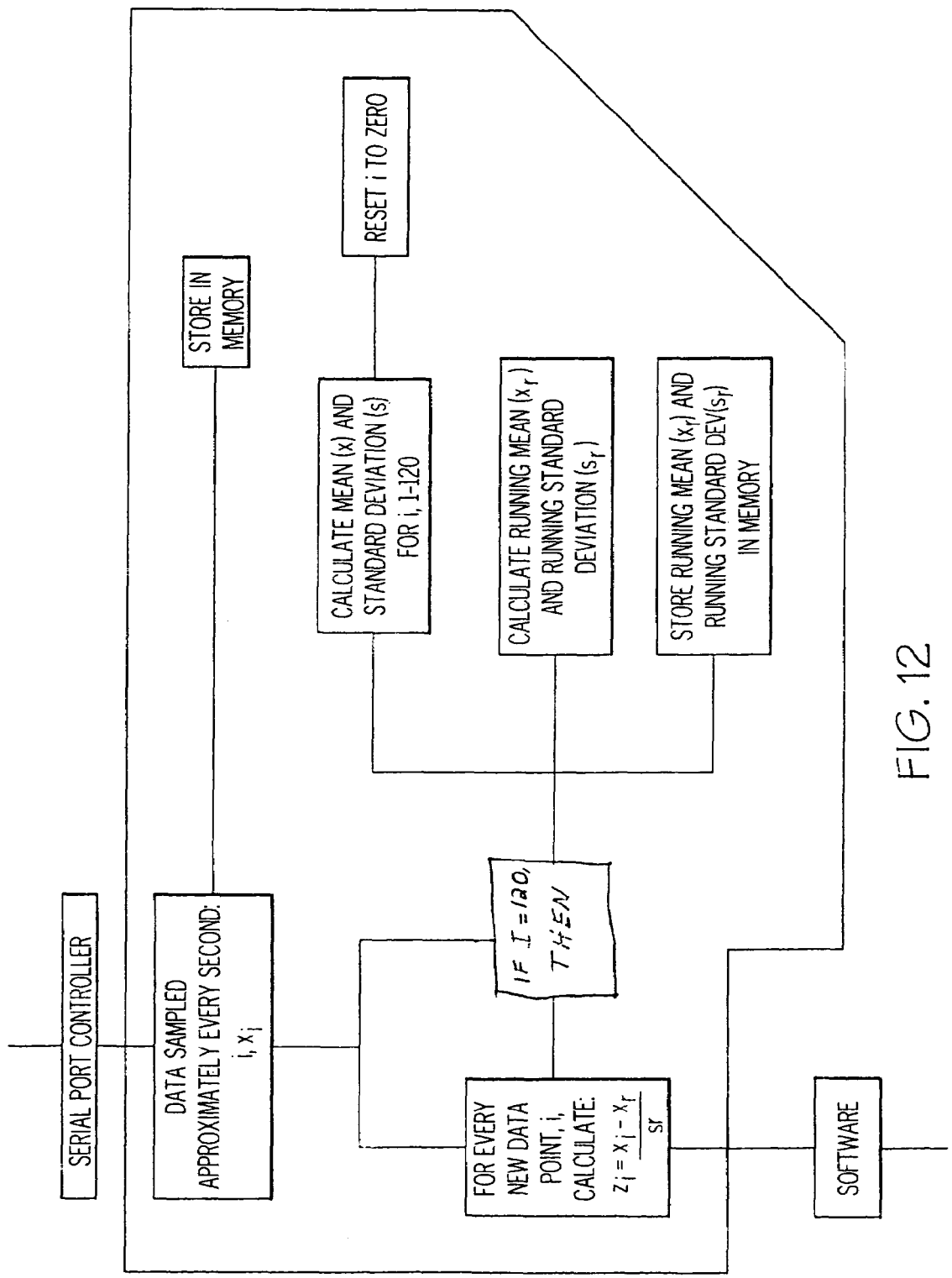
FIG. 12 is a flow chart depicting an exemplary set of executable instructions of the present invention.

FIG. 12 is a schematic diagram of an exemplary set of executable instructions for the primary micro-processing. The micro-processing steps process physiological data and deliver it to the software so that the software can react to the ability of the player to alter his physiology. In one embodiment, the primary microprocessor has RAM and ROM capability so that it can not only store incoming physiological data streams but also perform mathematical transformations on them. FIG. 12 is an example of one such transformation. In this particular embodiment, data from all monitored physiological data streams (in digital/parallel form) are sampled approximately every second. This data is initially stored in memory. The first 120 seconds serve as an initialization period. While the data streams are being collected and stored, no calculations are made for each physiological variable. After the first two minutes pass, a mean and standard deviation are calculated. In the subsequent two minutes, these values will represent the running means and running standard deviations and will be utilized to calculate Z values for their respective physiological variable. So each physiological modality such as heart rate will have a unique running mean and standard deviation. The Z value calculated for heart rate will be delivered to the software as a stream along with Z values for other variables being monitored.

After the second two minute time period, a new mean and standard deviation will be calculated for the second time span. The result will be averaged into the running mean and running standard deviation to update these values and the new running mean and running standard deviation will be used to calculate Z values for the next 120 seconds. The running mean and running standard deviation is constantly updated every two minutes as long as game play continues uninterrupted. The Z values for all the physiological variables are continuously being relayed to the software which is referred to as the signal/software interface in FIG. 11.

The components of the videogame system (i.e., circuit boards, power supply, RAM and ROM, display adapter, etc.) are easily obtainable by one of ordinary skill in the art. The circuit board in one exemplary embodiment contains a microprocessor which contains executable instructions.

Figure 13A:
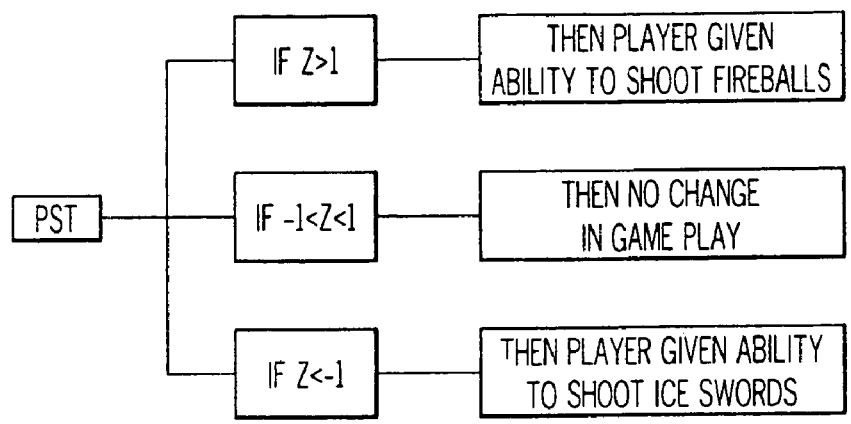
FIG. 13 depicts exemplary utilization of data processed by the present invention.
Figure 13B:
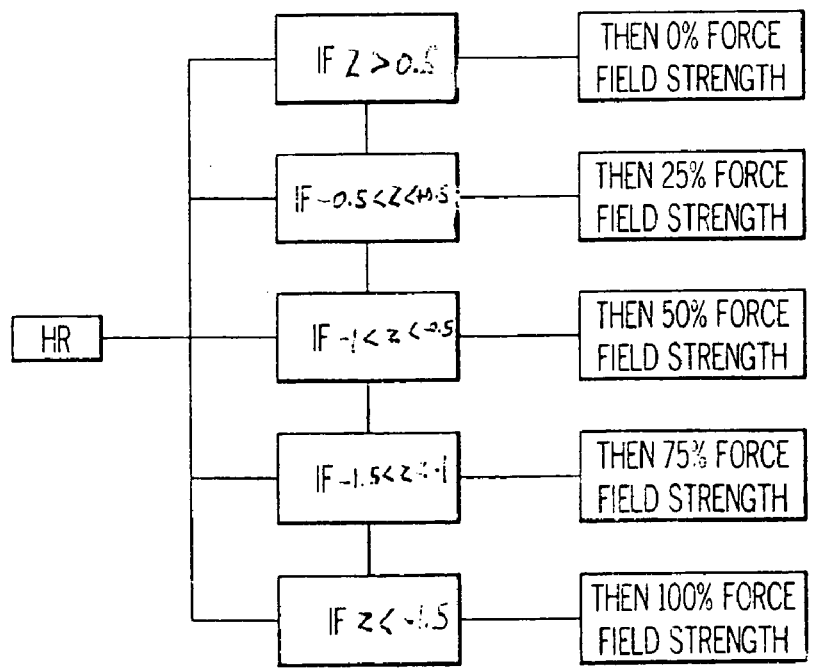

An example of how a software programmer could utilize the incoming streams of Z-values is depicted in FIG. 13. The programmer is able to utilize this processed data to incorporate outcomes within the game that depend on the player's ability to change certain measured physiological variables. The programmer can incorporate the data into the program using the degree of success so that the outcome in the game depends on how well the player is able to alter his physiology or alternatively, the programmer can us arbitrary cutoff points in all-or-nothing outcomes.

One exemplary embodiment is depicted in FIG. 13. FIG. 13 depicts specific examples of how a software programmer can utilize the information from this new computer system to enhance game play. A hypothetical case will be illustrated to better explain the capabilities and features of the system. In one embodiment, a player turns on a display device and the video game machine equipped with the present invention. The player inserts a fantasy game into the control deck and as instructed, the player places his hands around the controller and inserts his second and third digits into the retention rings. The controller is equipped with a thermocouple, silver electrode system and a LED/photoreceptor to measure peripheral skin temperature (PST), galvanic skin resistance (GSR) and heart rate respectively. The PST, GSR and heart rate are measured and processed according to the present invention as described above and illustrated in FIGS. 11 & 12. After two minutes of "initialization", Z values are calculated for each physiological variable on a second to second basis and relayed to the software.

The introduction ends and the player starts off on his journey through a fantasy world of dragons and sorcerers. Since, the Z values are continuously being updated and relayed to the software, the software programmer can utilize the ability of the player to alter their physiology to change outcomes of the game. For example, as illustrated in FIG. 13, if the Z values for PST becomes greater than one (temperature change in the hand greater than one standard deviation over running mean), the software programmer may allow the player the ability to shoot fireballs. If the values for Z are $-1<Z<1$, the programmer may allow the player to have no change in game play. If $Z<-1$ (temperature change less than one standard deviation below mean), the programmer may allow the player the ability to shoot ice swords. Another example would be based on monitored HR. If $Z>0.5$, there is no change in game play. If $-0.5<Z<0.5$ for HR, the software programmer may allow a force field strength of 25%. Whereas if $-1<Z<-0.5$, the software programmer may allow a 50% force field strength. If $-1.5<Z<-1$, the software programmer may allow a 75% force field strength; and if $Z<-1.5$, the software programmer may allow a 100% force field strength. One skilled in the art could conceive of a program or routine designed specifically to create a continuum of effects over a range of Z values.

Figure 15:
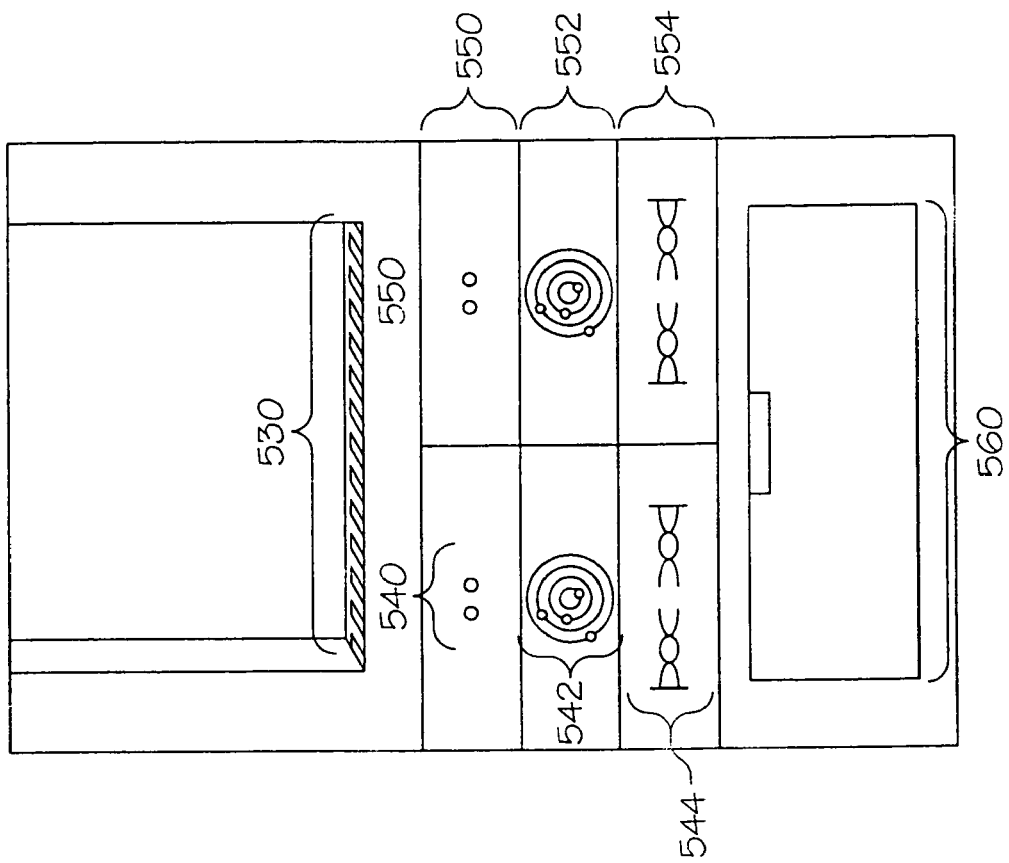
FIG. 15 is a schematic illustration of the back view of the handheld video gaming system of the present invention.
Figure 14:
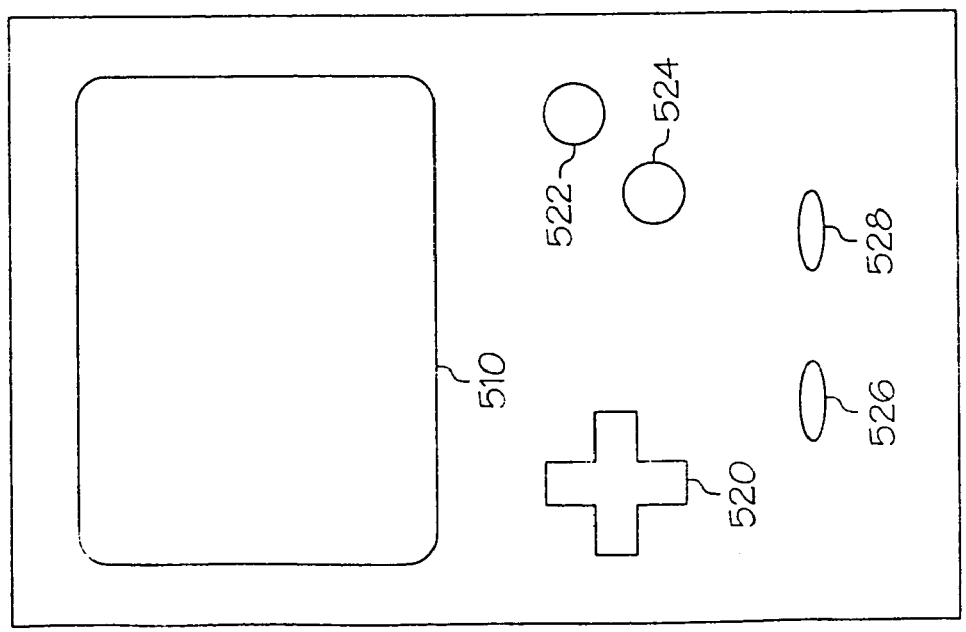
FIG. 14 is a schematic illustration of a typical handheld video gaming system known in the art.

Another exemplary embodiment of the present invention comprises a hand-held video gaming system as depicted in FIGS. 14 and 15. FIG. 14 depicts a front view of the hand-held video gaming system. This configuration is well known to one of ordinary skill in the art. A directional keypad (520) is located adjacent function buttons A&B (522 & 524). In addition, a select game button (526) and a start button (528) are depicted in FIG. 14. FIG. 15 depicts the back view of the hand-held video gaming system. A game port (530) can be visualized on the back of the hand-held gaming system. Located below the game port are three finger wells (550, 552 and 554) that are configured to ensure contact between the $2^{nd}$, $3^{rd}$ and $4^{th}$ digits of the game player's hand and the sensors during play. The three basic sensors for monitoring physiological variables are located within the wells. An LED/photodiode (540) is depicted in the first well. The LED/photodiode (540) is able to monitor blood volume pulse, peripheral pulse and respiration as previously cited in the art.

A silver four electrode unit (542) is illustrated in the second well. This unit is able to monitor GSR and a one-lead ECG. The third well comprises a thermocouple (544). The thermocouple is able to monitor peripheral skin temperature. A compartment (560) allows utilization of a portable power source such as batteries.

Figure 17:
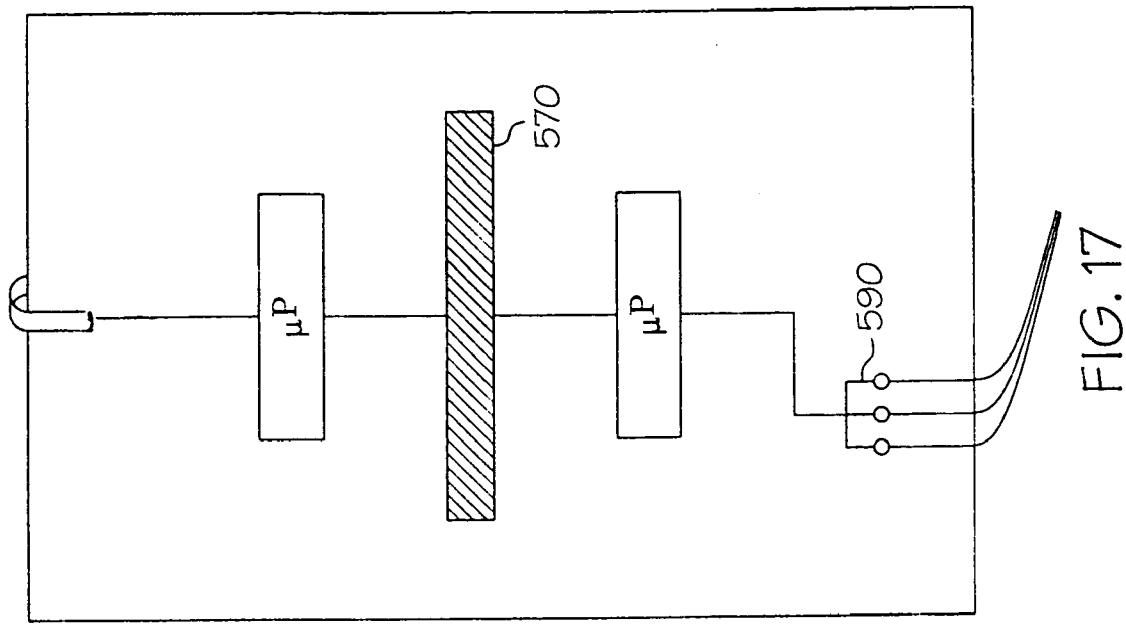
FIG. 17 is a schematic illustration of the back view of an exemplary circuit board of the handheld video gaming system of the present invention.
Figure 16:
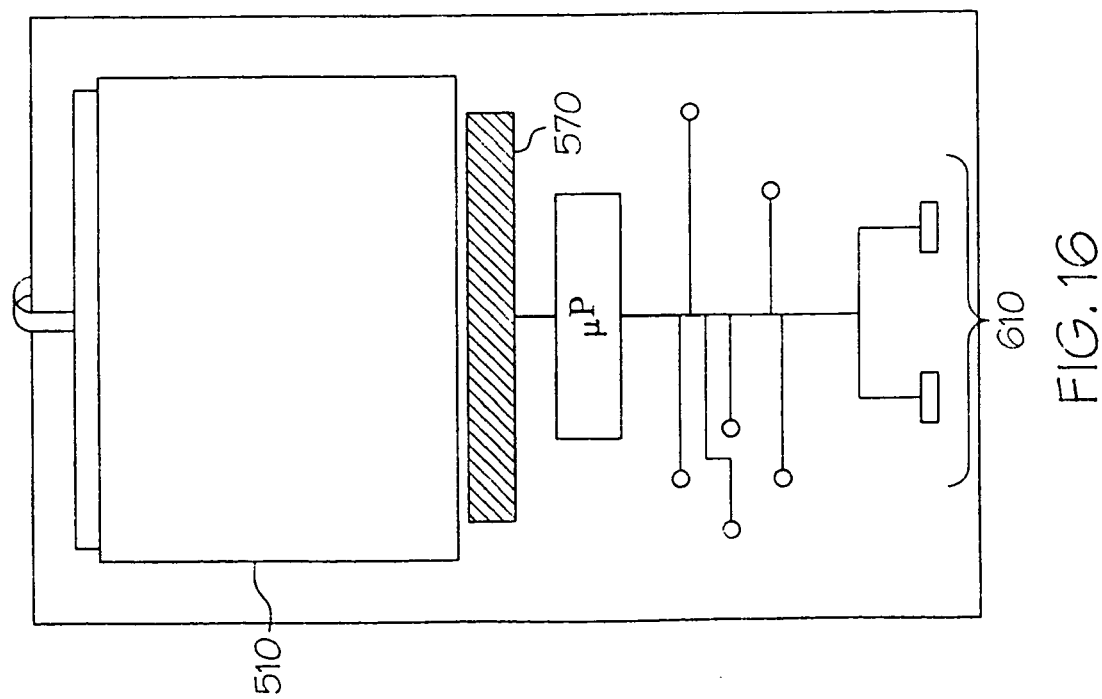
FIG. 16 is a schematic illustration of a front view of an exemplary circuit board of the handheld video gaming system of the present invention.

An exemplary embodiment of the circuit board is illustrated in FIGS. 16 and 17. A video display (510) is attached to the top of the circuit board as shown in FIG. 16. The physiological data monitored by the sensors located in the finger wells is relayed unprocessed back to the circuit board (590). At this point the physiological data undergoes multi-level processing before being sent, in processed form, to the software via the software-circuit board interface (570). In one exemplary embodiment, the multilevel processing is the same as described above for the video gaming system of the present invention. Once delivered to the software, the data is stored so that it can later be accessed. The data resulting from the manual manipulation of the controller is also relayed back to the circuit board (610). This data undergoes its own unique multi-level processing before it is relayed to the software-circuit board interface (570). Once delivered to the software, this data is also stored for later use. Both types of processed data, physiological and manual, are stored and accessed by the software and incorporated into the video game program in real time and the output is sent back to the circuit board where it is further processed and then delivered to a video display.

The examples of specific embodiments set forth herein are for illustrative purposes only and are not intended to limit the scope of the methods and fabrics of the invention. Additional methods and fabric within the scope of the claimed invention will be apparent of one skilled in the art in view of the teachings set forth herein.

What is claimed is:

1. A handheld video gaming system comprising:
   a shell;
   a video display;
   a computer readable medium containing executable instructions for providing a video game;
   a video processor;
   one or more biofeedback devices incorporated into the shell of the handheld video gaming system;
   a speaker;
   a communication link; and
   a respiratory voice sensor;
   wherein the speaker and the respiratory voice sensor are in electrical communication with the communication link and wherein the respiratory voice sensor comprises a thermocouple and a microphone.

2. The handheld video gaming system of claim 1, wherein the thermocouple comprises a polyvinylidine fluoride thermocouple.

3. The handheld video gaming system of claim 1, further comprising:
   a) a circuit board;
   b) one or more input adapters in communication with the circuit board, wherein the input adapters are configured to carry data from at least two distinct data types;
   c) an analog to digital converter in communication with the circuit board;
   d) one or more shift registers in communication with the circuit board;
   e) a serial to parallel converter in communication with the circuit board; and
   f) a microprocessor in communication with the circuit board and a software input module;
   wherein the two distinct data types comprise manual controller data and physiological data.

4. The handheld video gaming system of claim 3, further comprising a network connection, wherein the network connection allows the handheld video gaming system to send and receive information to and from other video game systems.

5. The video game system of claim 4, wherein the software input module is located on a client computer or a server computer.

6. A video game system comprising:
   a) a video game processor;
   b) a computer readable medium containing executable instructions for providing a video game;
   c) a microprocessor in communication with the video game processor;
   d) one or more input adapters in communication with the microprocessor, wherein the input adapters are configured to carry data from at least two distinct data types, and further wherein the data types comprise physiological data from a game player and conventional controller data;
   wherein the microprocessor comprises executable instructions for dynamically determining a "z" value which represents the number of running standard deviations the physiological data is away from a calculated running mean of the physiological data;
   wherein the executable instructions further comprise transmitting the "z" value dynamically to the video game processor; and wherein the video game processor comprises executable instructions for comparing the "z" value against pre-determined "z" value thresholds and altering the output of the video game based on such comparison.

7. The video game system of claim 6, further comprising an earpiece, wherein the earpiece is comprised of:
   a speaker;
   a communication link; and
   a respiratory voice sensor;
   wherein the speaker and the respiratory voice sensor are in electrical communication with the communication link.

8. The video game system of claim 7, wherein the respiratory voice sensor comprises a thermocouple and a microphone.

9. The video game system of claim 8, wherein the thermocouple comprises a polyvinylidine fluoride thermocouple.

10. A method for providing player physiological data to a video gaming system software input module, wherein the method comprises the steps of:
    a) receiving input data through an input adapter on the video gaming system, wherein the input data comprises multiple unprocessed physiological data points;
    b) transforming the unprocessed physiological data from an analog form to a digital form utilizing an analog to digital converter;
    c) collecting the digital form of the physiological data on a shift register, wherein the physiological data is collected serially;
    d) converting the serial physiological data into a parallel form;
    e) delivering the parallel form of the physiological data to a data bus;
    f) transferring the parallel physiological data on the parallel data bus to a microprocessor;
    g) relaying the parallel physiological data to a ROM unit, wherein the ROM unit stores the parallel physiological data;

h) accessing the ROM unit utilizing a RAM unit to perform pre-defined calculations of the parallel physiological data;
i) calculating a "z" value for the parallel physiological data utilizing a running mean and running standard deviation of the parallel physiological data;
j) transferring the "z" value to a shift register in a serial manner;
k) converting the serial "z" value to a parallel form of the "z" value;
l) transferring the parallel form "z" value to a microprocessor; and
m) relaying the parallel form "z" value from the microprocessor to a software input module.

11. The method of claim 10, wherein step m) is performed by relaying the parallel form "z" value to a software input module located on a client computer or a server computer.

* * * * *

UNITED STATES PATENT AND TRADEMARK OFFICE
CERTIFICATE OF CORRECTION

PATENT NO.        : 7,625,285 B2                                                Page 1 of 1
APPLICATION NO.  : 10/878704
DATED             : December 1, 2009
INVENTOR(S)       : Joel S. Breving It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1524 days.

Signed and Sealed this

Twenty-sixth Day of October, 2010

David J. Kappos
*Director of the United States Patent and Trademark Office*